(12) United States Patent
Chou et al.

(10) Patent No.: US 8,369,074 B2
(45) Date of Patent: Feb. 5, 2013

(54) KEYBOARD DEVICE FOR USE WITH TABLET PERSONAL COMPUTER

(75) Inventors: Shu-Wei Chou, Taipei (TW); Chun-Nan Su, Taipei (TW); Chun-Che Wu, Taipei (TW); Tun-Shin Wang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 308 days.

(21) Appl. No.: 12/940,572

(22) Filed: Nov. 5, 2010

(65) Prior Publication Data

US 2012/0057288 A1 Mar. 8, 2012

(30) Foreign Application Priority Data

Sep. 3, 2010 (TW) ................................ 99129828 A

(51) Int. Cl.
*G06F 1/16* (2006.01)

(52) U.S. Cl. ................... 361/679.09; 345/169; 439/131; 235/487; 248/118.1

(58) Field of Classification Search .................. 345/168, 345/440, 582, 167, 169, 2.2, 156, 589; 361/679.09, 361/679.26, 679.03, 679.55, 679.27, 679.01, 361/679.11, 679.57, 679.08, 679.41, 679.22, 361/679.12, 679.06, 679.32, 679.2, 679.15, 361/679.17; 439/347, 680, 607.01, 135, 439/31, 131, 607.25, 142; 235/385, 383, 235/379, 375, 487, 472.02; 248/452, 176.1, 248/278.1, 160, 288.51, 118.1, 553, 500, 248/580; 312/236, 237, 223.3, 208.4, 223.6, 242, 214

See application file for complete search history.

(56) References Cited

U.S. PATENT DOCUMENTS

| | | | | |
|---|---|---|---|---|
| 5,295,089 A | * | 3/1994 | Ambasz | 361/679.09 |
| 2004/0090742 A1 | * | 5/2004 | Son et al. | 361/686 |
| 2012/0127646 A1 | * | 5/2012 | Moscovitch | 361/679.09 |

* cited by examiner

*Primary Examiner* — Hung Duong

(74) *Attorney, Agent, or Firm* — Kirton McConkie; Evan R. Witt

(57) ABSTRACT

A keyboard device for use with a tablet personal computer includes a base body and an upper cover. The base body includes a handle and plural keys. The handle is integrally formed with the base body. The upper cover has a receptacle for accommodating the tablet personal computer. The upper cover is connected with the base body. In addition, the upper cover is rotatable with respect to the base body in order to open or close the upper cover of the keyboard device. When the upper cover of the keyboard device is opened, the tablet personal computer is stored within the receptacle, so that the user may input characters or symbols to the tablet personal computer by depressing the keys. Whereas, when the upper cover of the keyboard device is closed, the keyboard device may be carried by grasping the handle.

10 Claims, 7 Drawing Sheets

KEYBOARD DEVICE FOR USE WITH TABLET PERSONAL COMPUTER

FIELD OF THE INVENTION

The present invention relates to a keyboard device, and more particularly to a keyboard device for use with a tablet personal computer.

BACKGROUND OF THE INVENTION

Generally, the common input device of a computer system includes for example a mouse, a keyboard device or a trackball. Via the keyboard device, the user may input characters and instructions into the computer system. As a consequence, most users and most manufacturers pay much attention to the development of keyboard devices.

Hereinafter, the configurations and functions of a conventional keyboard device will be illustrated with reference to FIG. 1. FIG. 1 is a schematic view illustrating the outward appearance of a conventional keyboard device. The surface of the conventional keyboard device 1 includes plural keys. These keys include ordinary keys 10, numeric keys 11 and function keys 12. When one or more keys are depressed by the user, a corresponding signal is issued to the computer, and thus the computer executes a function corresponding to the depressed key or keys. For example, when the ordinary keys 10 are depressed, corresponding English letters or symbols are inputted into the computer system. In addition, the function keys 12 (F1~F12) can be programmed to cause corresponding application programs to provide certain functions.

With increasing development of science and technology, a tablet personal computer is introduced into the market. The tablet personal computer has a small-sized shape as a LCD screen. Generally, the display screen of the tablet personal computer is a touch screen. Via the touch screen, the user may input instruction to the tablet personal computer to control operations of the tablet personal computer. Generally, when the user wants to input a character or a symbol into the tablet personal computer, an on-screen keyboard is enabled and shown on the touch screen of the tablet personal computer. The on-screen keyboard is virtual keyboard simulating the real keyboard device. By touching an icon of the on-screen keyboard, a corresponding character or symbol is inputted into the tablet personal computer. In other words, characters or symbols may be directly inputted into the tablet personal computer without any external keyboard device.

Although the tablet personal computer is easily carried because it has a small-sized shape and no external keyboard device is needed, there are still some drawbacks. For example, the use of the touch screen to input characters or symbols becomes hindrance for most users who are familiar with the common personal computers or notebook computers. Consequently, in many circumstances, an external keyboard device that has functions and configurations similar to the keyboard device as shown in FIG. 1 is connected to the tablet personal computer. In addition, the tablet personal computer is placed and supported on a prop stand (e.g. a bookshelf). That is, the tablet personal computer is usually considered as a common display screen, and the external keyboard device is used for inputting characters or symbols. Generally, the external keyboard device is connected with the tablet personal computer via a universal serial bus (USB) connection.

Although the external keyboard device may facilitate the user to operate the tablet personal computer in the usual practice, there are still some drawbacks. For example, the external keyboard device and the tablet personal computer need to be simultaneously carried. If the external keyboard device is not simultaneously carried with the tablet personal computer, the user has no choice but to input characters or symbols through the on-touch keyboard of the touch screen. From the above discussions, if the user wants to operate the tablet personal computer in the usual practice, the external keyboard device should be additionally carried. If the user does not want to additionally carry the external keyboard device, the user needs to directly input characters or symbols through the on-touch keyboard of the touch screen The above two approaches, however, are not user-friendly.

Therefore, there is a need of providing an easily-carried and easy-to-use keyboard device for use with a tablet personal computer so as to obviate the drawbacks encountered from the prior art.

SUMMARY OF THE INVENTION

The present invention provides a keyboard device for use with a tablet personal computer. Like the common keyboard device, the keyboard device of the present invention has a function of inputting characters or symbols. In addition, the keyboard device of the present invention is capable of storing the tablet personal computer therein.

In accordance with an aspect of the present invention, there is provided a keyboard device for use with a tablet personal computer. The keyboard device is in communication with the tablet personal computer and permitted to store the tablet personal computer therein. The keyboard device includes a base body and an upper cover. The base body includes a handle and plural keys. The handle is disposed at a first edge of the base body and integrally formed with the base body. The keys are disposed on the base body for inputting at least one character or at least one instruction into the tablet personal computer. The upper cover is connected with the base body, and rotatable with respect to the base body to shelter the base body or define an included angle between the upper cover and the base body. The upper cover has a receptacle for accommodating the tablet personal computer. When the upper cover is rotated with respect to the base body to define the included angle between the upper cover and the base body, the handle is contacted with the upper cover, so that the upper cover is stopped from being continuously rotated with respect to the base body.

In an embodiment, the base body further includes a receiving part, which is arranged between the plural keys and the first edge of the base body for accommodating a short side of the tablet personal computer, thereby preventing detachment of the tablet personal computer from the receiving part.

In an embodiment, the tablet personal computer further includes a first wireless transmission module, and the base body further includes a second wireless transmission module in communication with the plural keys. When the second wireless transmission module is in communication with the first wireless transmission module, the at least one character or the at least one instruction inputted by depressing the plural keys is transmitted from the second wireless transmission module to the first wireless transmission module.

In an embodiment, the first wireless transmission module and the second wireless transmission module are Bluetooth transmission modules.

In an embodiment, the upper cover further includes an auxiliary recess and a locking element. The auxiliary recess is disposed beside the receptacle. When the tablet personal computer is accommodated within the receptacle, a short side of the tablet personal computer is exposed outside through the auxiliary recess. The locking element is disposed on an upper rim of the upper cover, and movable with respect to the upper rim of the upper cover. When the locking element is moved with the upper rim of the upper cover to a fixed position, the tablet personal computer is stopped by the locking element and fixed within the receptacle. When the locking element is moved with the upper rim of the upper cover to a releasing position, the tablet personal computer is not stopped by the locking element.

In an embodiment, the handle further includes a battery room for accommodating a battery, so that electricity generated by the battery is outputted through the battery room.

In an embodiment, the base body further includes a first magnetic element arranged at a second edge of the base body, and the upper cover further includes a second magnetic element arranged at an upper rim of the upper cover. When the upper cover is rotated with respect to the base body, the first magnetic element and the second magnetic element are magnetically attracted by each other, so that the base body is covered by the upper cover.

In an embodiment, the base body further includes a magnetic element arranged at a second edge of the base body, and the upper cover further includes a metallic element arranged at an upper rim of the upper cover. When the upper cover is rotated with respect to the base body, the metallic element is magnetically attracted by the magnetic element, so that the base body is covered by the upper cover.

In an embodiment, the base body further includes a metallic element arranged at a second edge of the base body, and the upper cover further includes a magnetic element arranged at an upper rim of the upper cover. When the upper cover is rotated with respect to the base body, the metallic element is magnetically attracted by the magnetic element, so that the base body is covered by the upper cover.

In an embodiment, the handle includes a first stopping part, a second stopping part, a first rotating shaft and a second rotating shaft. The first stopping part is arranged at a first side of the first edge of the base body. The second stopping part is arranged at a second side of the first edge of the base body. The first rotating shaft is extended from the first stopping part and inserted into a first side of the upper cover. The second rotating shaft is extended from the second stopping part and inserted into a second side of the upper cover, so that the upper cover is rotatable with respect to the base body. When the upper cover is rotated with respect to the base body to define the included angle, the first stopping part is contacted with a first end of the upper cover and the second stopping part is contacted with a second end of the upper cover, so that the upper cover is stopped from being continuously rotated with respect to the base body.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
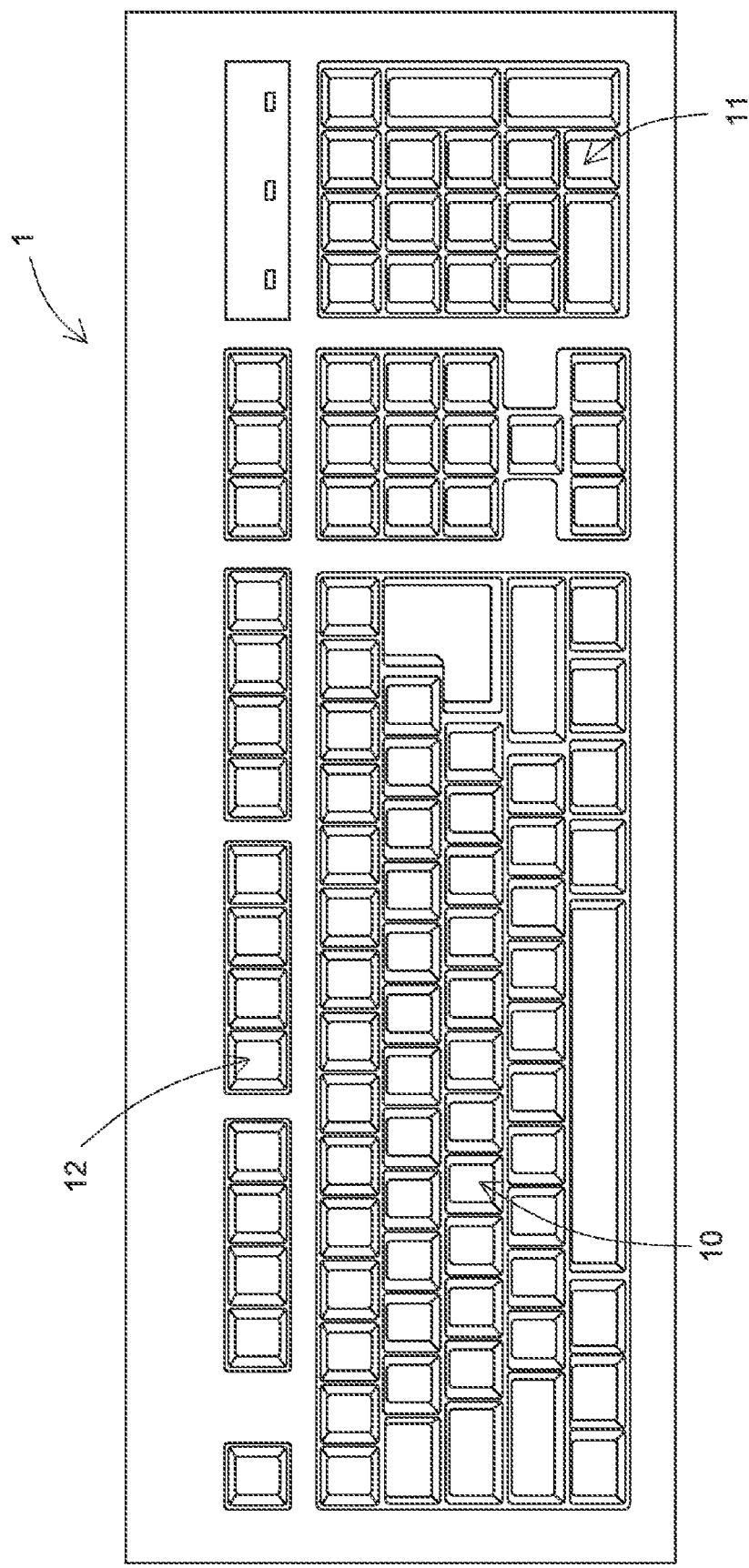
FIG. 1 is a schematic view illustrating the outward appearance of a conventional keyboard device.
Figure 2:
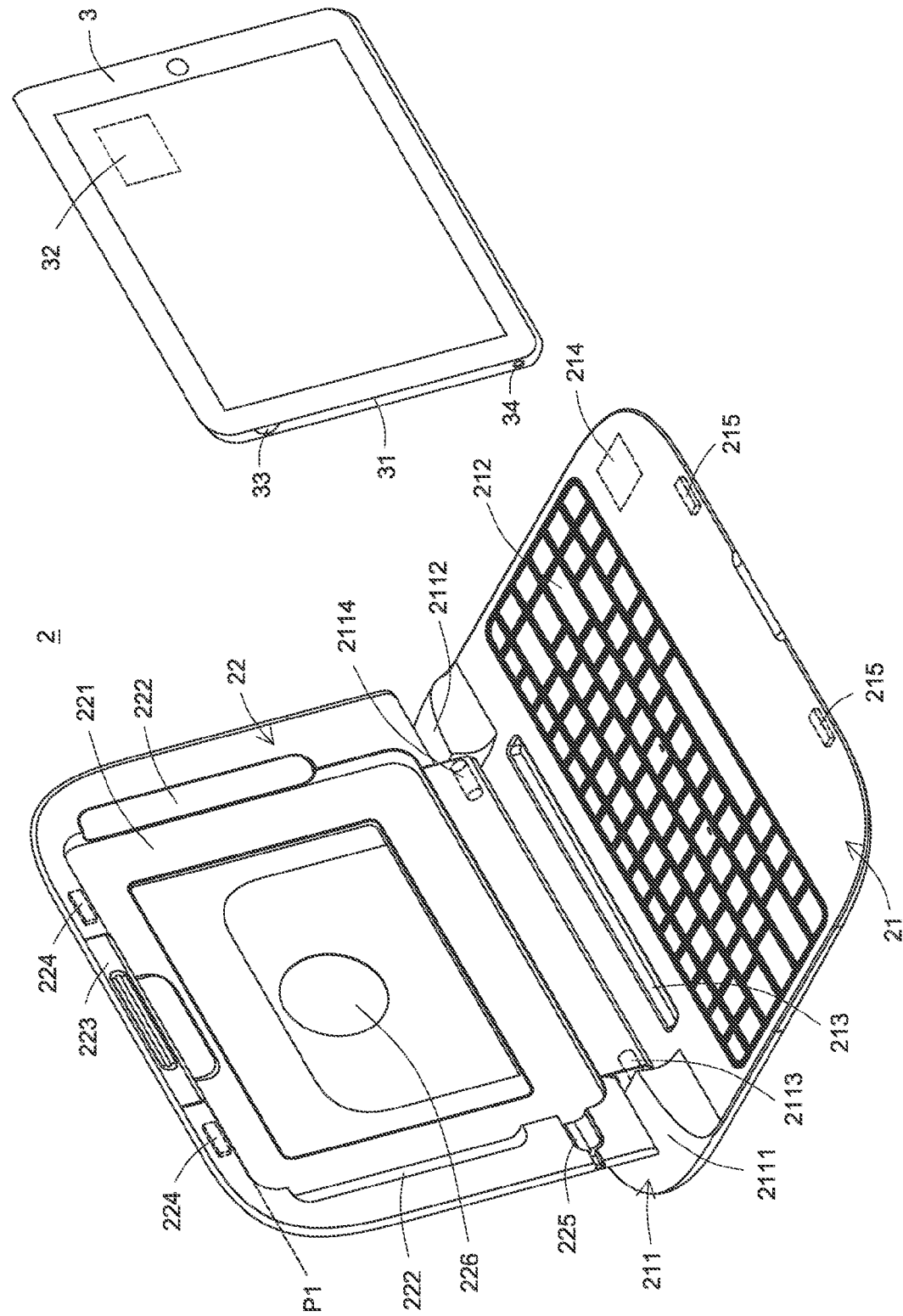
FIG. 2 is a schematic perspective view illustrating a keyboard device for use with a tablet personal computer according to an embodiment of the present invention, in which the tablet personal computer is in a usage mode.
Figure 7:
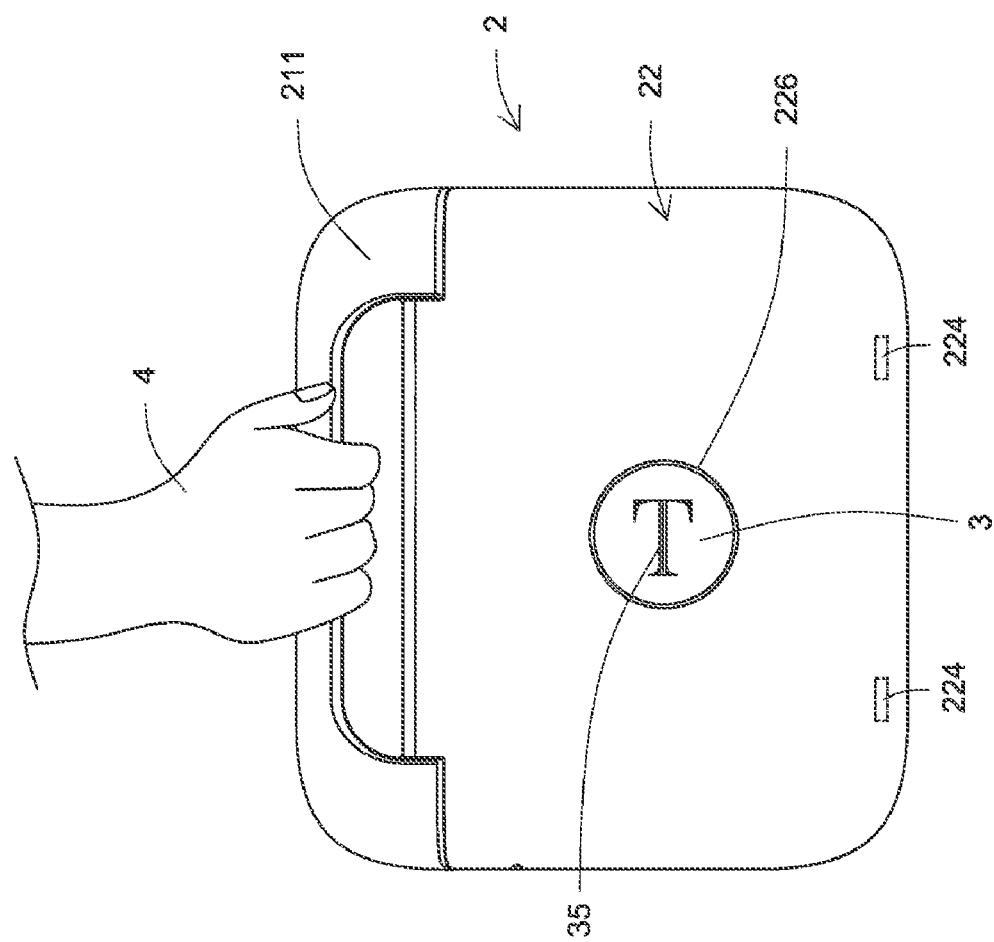
FIG. 7 is a schematic side view illustrating the keyboard device shaped as a travelling case to be carried according to an embodiment of the present invention.

For obviating the drawbacks encountered from the prior art, the present invention provides a keyboard device for use with a tablet personal computer. The keyboard device is communicable with the tablet personal computer and can store the tablet personal computer therein. FIG. 2 is a schematic perspective view illustrating a keyboard device for use with a tablet personal computer according to an embodiment of the present invention, in which the tablet personal computer is in a usage mode. In FIG. 2, a keyboard device 2 and a tablet personal computer 3 are shown. The tablet personal computer 3 comprises a short side 31, a first wireless transmission module 32, a power switch 33, a connecting wire hole 34 and a mark 35 (see FIG. 7). The power switch 33 and the connecting wire hole 34 are disposed on the short side 31 of the tablet personal computer 3. By operating the power switch 33, the tablet personal computer 3 is selectively turned on or turned off. When a connecting wire of a computer peripheral audio device such as an earphone or a loudspeaker (not shown) is inserted into the connecting wire hole 34, the computer peripheral audio device is in communication with the tablet personal computer 3. In this embodiment, the first wireless transmission module 32 is a Bluetooth transmission module.

Figure 5:
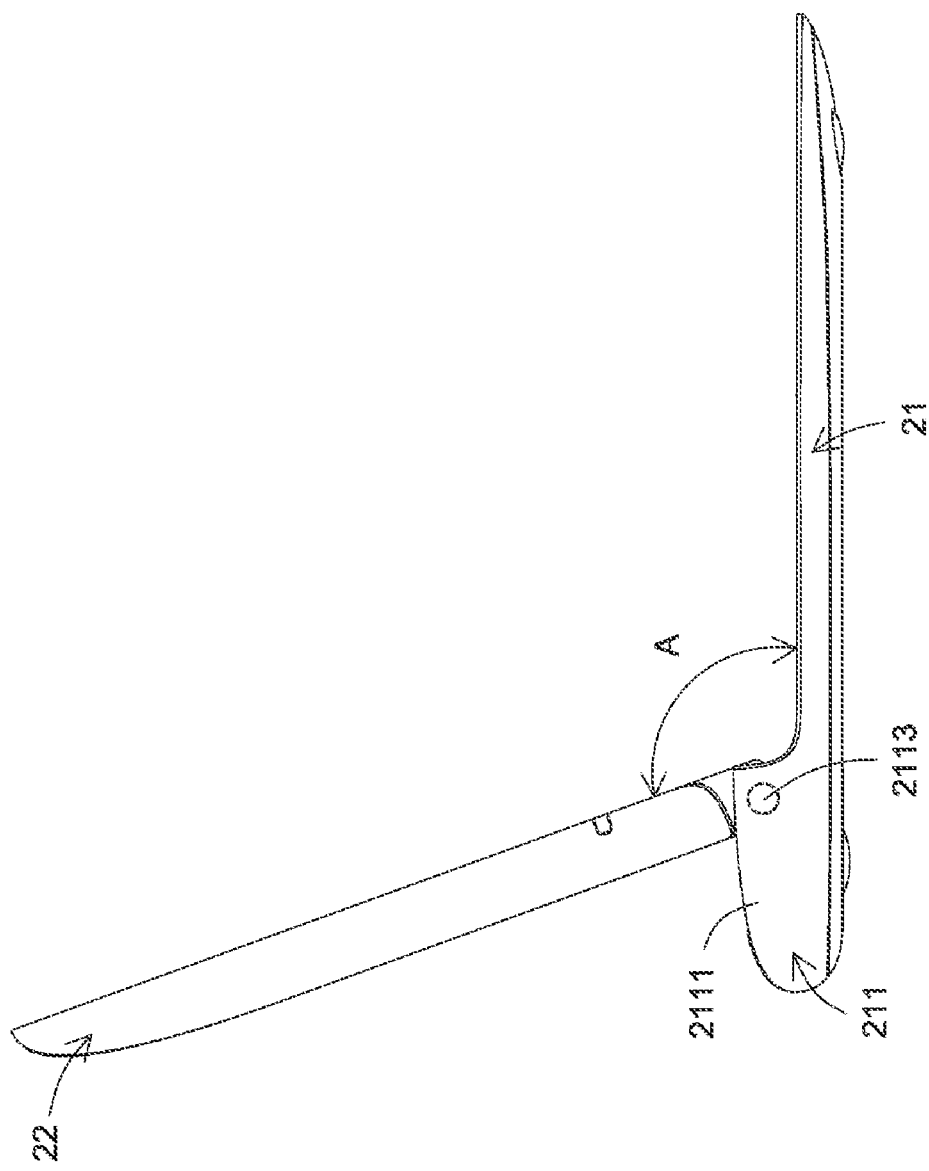
FIG. 5 is a schematic perspective view illustrating the tablet personal computer stored within the keyboard device as shown in FIG. 4.

As shown in FIG. 2, the keyboard device 2 is in a usage mode. The keyboard device 2 comprises a base body 21 and an upper cover 22. The upper cover 22 is connected with the base body 21. In addition, the upper cover 22 is rotatable with respect to the base body 21, so that an included angle A is defined between the upper cover 22 and the base body 21 (see FIG. 5). The base body 21 comprises a handle 211, plural keys 212, a fixing recess 213, a second wireless transmission module 214 and two first magnetic elements 215. The handle 211 is disposed on an edge of the base body 21 to be handheld by a user. It is preferred that the handle 211 is integrally formed with the base body 21. The handle 211 comprises a first stopping part 2111, a second stopping part 2112, a first rotating shaft 2113 and a second rotating shaft 2114. The first stopping part 2111 is arranged at a first side (e.g. the left side of FIG. 2) of the edge of the base body 21. The second stopping part 2112 is arranged at a second side (e.g. the right side of FIG. 2) of the edge of the base body 21. The first rotating shaft 2113 is extended from the first stopping part 2111 to be inserted into a first side of the upper cover 22. The second rotating shaft 2114 is extended from the second stopping part 2112 to be inserted into a second side of the upper cover 22. The base body 21 is connected with the upper cover 22 through the first rotating shaft 2113 and the second rotating shaft 2114. Moreover, through the first rotating shaft 2113 and the second rotating shaft 2114, the upper cover 22 is rotatable with respect to the base body 21.

The plural keys 212 are disposed on the base body 21 and exposed outside the base body 21. When the keys 212 are depressed by the user, corresponding characters or symbols are inputted. The fixing recess 213 is arranged between the plural keys 212 and the edge of the base body 21. The fixing recess 213 is used for accommodating the short side 31 of the tablet personal computer 3 in order to prevent detachment of the tablet personal computer 3 from the fixing recess 213. The second wireless transmission module 214 is in communication with the plural keys 212. When the second wireless transmission module 214 is in communication with the first wireless transmission module 32, the characters or symbols generated by depressing the keys 212 may be transmitted from the second wireless transmission module 214 to the first wireless transmission module 32. The two first magnetic elements 215 are disposed on a second edge of the base body 21. In this embodiment, the second wireless transmission module 214 is a Bluetooth transmission module, and the first magnetic elements 215 are magnets.

Please refer to FIG. 2 again. The upper cover 22 comprises a receptacle 221, an auxiliary recess 222, a locking element 223, two second magnetic elements 224, a connecting wire recess 225 and a circular hole 226. The receptacle 221 is used for accommodating the tablet personal computer 3. The auxiliary recess 222 is disposed beside the receptacle 221. When the tablet personal computer 3 is accommodated within the receptacle 221, the short side 31 of the tablet personal computer 3 is exposed outside through the auxiliary recess 222 and thus touchable by the user's finger. The locking element 223 is disposed on an upper rim of the upper cover 22. In addition, the locking element 223 is movable upwardly and downwardly with respect to the upper rim of the upper cover 22. As shown in FIG. 2, the locking element 223 is located at a releasing position P1. The two second magnetic elements 224 are disposed on the upper rim of the upper cover 22. By rotating the upper cover 22 toward the base body 21, the first magnetic elements 215 and the second magnetic elements 224 are magnetically attracted by each other. In this embodiment, the second magnetic elements 224 are also magnets. The connecting wire recess 225 is disposed at a side of the upper cover 22 and below the auxiliary recess 222.

Figure 3:
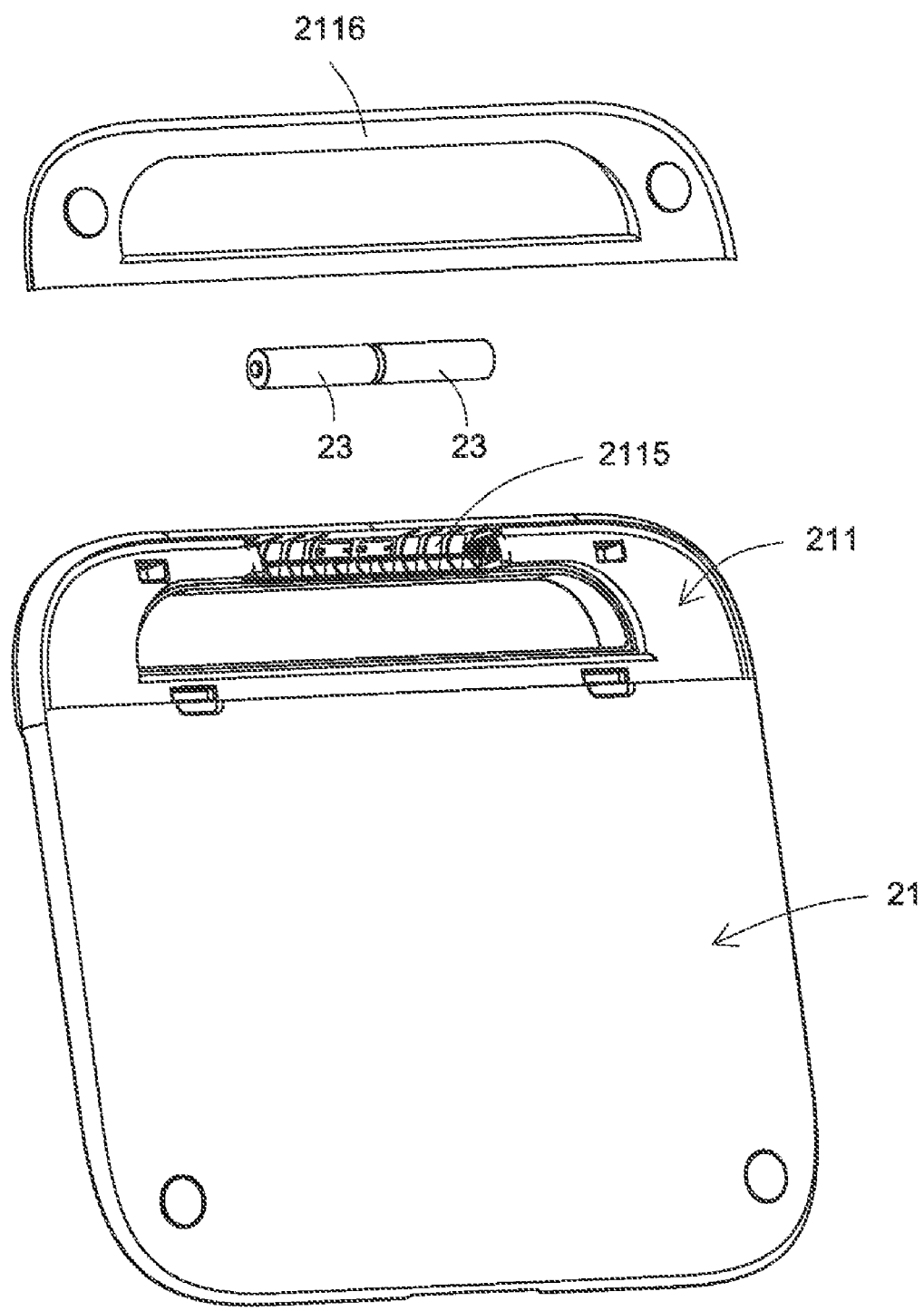
FIG. 3 is a schematic partial exploded view illustrating the keyboard device for use with a tablet personal computer according to the embodiment of the present invention and taken from another viewpoint.

FIG. 3 is a schematic partial exploded view illustrating the keyboard device for use with a tablet personal computer according to the embodiment of the present invention and taken from another viewpoint. As shown in FIG. 3, the handle 211 further comprises a battery room 2115 and a battery cover 2216. The battery room 2115 is used for accommodating two batteries 23 and outputting the electricity of the batteries 23, thereby powering the plural keys 212 and the second wireless transmission module 214. The battery cover 2216 is used to shelter the battery room 2115, so that the battery room 2115 is not exposed outside. As shown in FIG. 3, the handle 211 is integrally formed with the base body 21. In this embodiment, the handle 211 is D-shaped.

Figure 4:
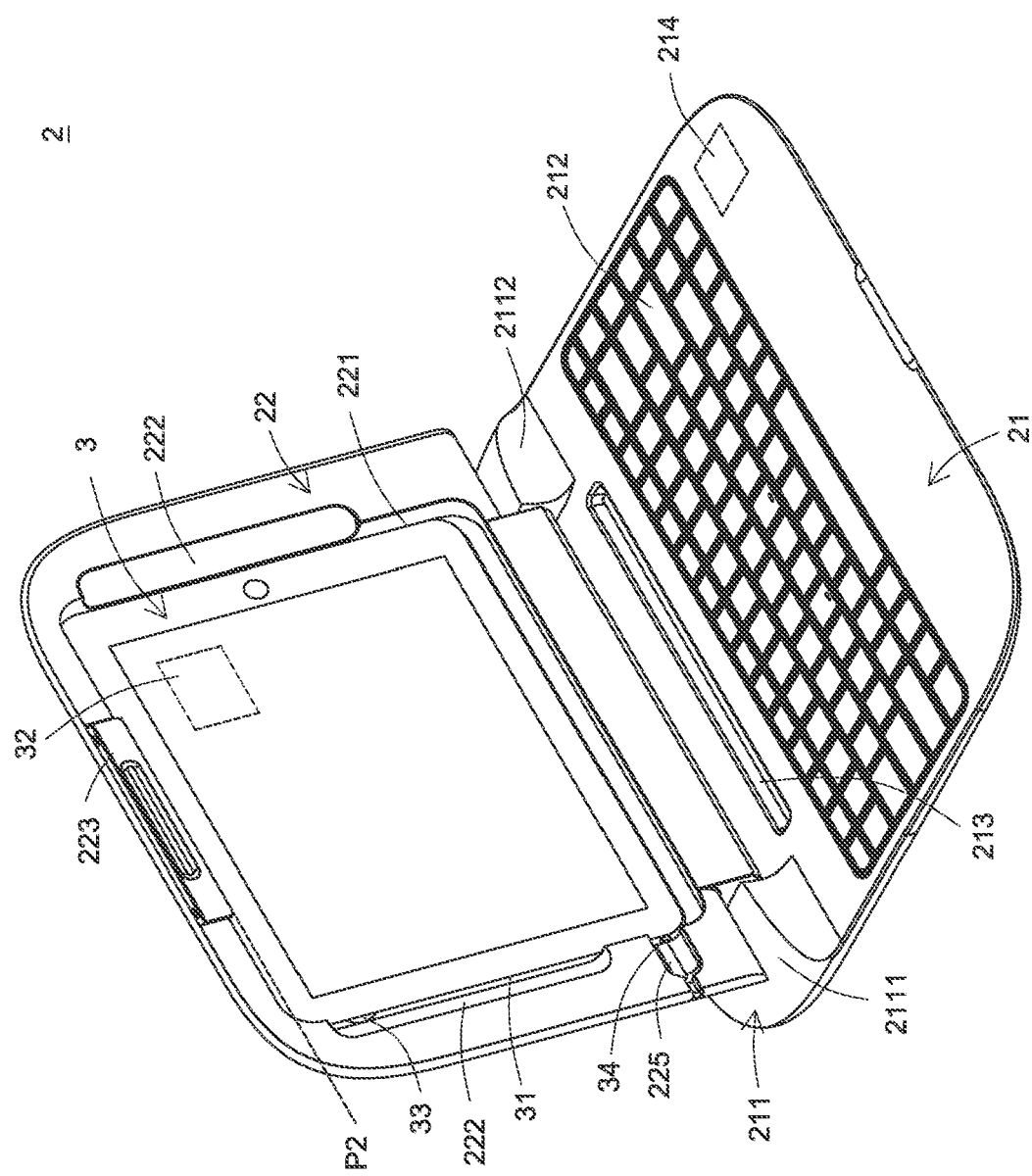
FIG. 4 is a schematic perspective view illustrating the operations of the tablet personal computer with the keyboard device according to an embodiment of the present invention, in which the tablet personal computer is stored within the keyboard device.

Hereinafter, the operations of the tablet personal computer 3 with the keyboard device 2 when the tablet personal computer 3 is installed in the keyboard device 2 will be illustrated with reference to some examples. FIG. 4 is a schematic perspective view illustrating the operations of the tablet personal computer with the keyboard device according to an embodiment of the present invention, in which the tablet personal computer is stored within the keyboard device. For using the keyboard device 2 to operate the tablet personal computer 3, the tablet personal computer 3 needs to be horizontally placed within the receptacle 221 of the upper cover 22, and then the locking element 223 at the upper rim of the upper cover 22 is moved downwardly. Until the locking element 223 is moved to a fixed position P2, the tablet personal computer 3 is stopped by the locking element 223 so as to prevent detachment of the tablet personal computer 3 from the receptacle 221. On the other hand, when the user wants to remove the tablet personal computer 3 from the receptacle 221, the locking element 223 needs to be moved from the releasing position P1 to the fixing position P2, and then the tablet personal computer 3 is removed.

In a case that the tablet personal computer 3 is accommodated within the receptacle 221, the short side 31 of the tablet personal computer 3 is arranged beside the auxiliary recess 222, so that the short side 31 of the tablet personal computer 3 is exposed outside. Once the short side 31 of the tablet personal computer 3 is exposed outside, the power switch 33 and the connecting wire hole 34 at the short side 31 of the tablet personal computer 3 are also exposed outside. In this situation, the user's finger may be inserted into the auxiliary recess 222 to turn on or turn off the tablet personal computer 3. Moreover, since the connecting wire hole 34 at the short side 31 of the tablet personal computer 3 is exposed to the connecting wire recess 225, the user may insert a connecting wire of a computer peripheral audio device such as an earphone or a loudspeaker (not shown) into the connecting wire hole 34, wherein the terminal of the connecting wire may be received in the connecting wire recess 225. As a consequence, the computer peripheral audio device is in communication with the tablet personal computer 3.

Moreover, when the upper cover 22 is rotatable with respect to the base body 21 by using the first rotating shaft 2113 and the second rotating shaft 2114 as the pivots, the included angle A between the upper cover 22 and the base body 21 is defined. In this situation, the keyboard device 2 may be used to operate the tablet personal computer 3. When the tablet personal computer 3 is accommodated within the receptacle 221 of the upper cover 22 of the keyboard device 2, the gravity force exerted on the upper cover 22 is increased from the own weight of the upper cover 22 to the overall weight of the upper cover 22 and the tablet personal computer 3. Due to the change of the gravity force exerted on the upper cover 22, the upper cover 22 will be continuously rotated with respect to the base body 21. However, the structure of the handle 211 may stop the upper cover 22 from being continuously rotated with respect to the base body 21 because the first stopping part 2111 is closer to the first side of the base body 21 (e.g. the left side as shown in FIG. 2) than the first rotating shaft 2113 and the second stopping part 2112 is closer to the second side of the base body 21 (e.g. the right side as shown in FIG. 2) than the second rotating shaft 2114. In other words, when the upper cover 22 is rotated with respect to the base body 21, the bottoms of the first side and the second side of the upper cover 22 are respectively contacted with the first stopping part 2111 and the second stopping part 2112, and thus stopped by the first stopping part 2111 and the second stopping part 2112. In this situation, the upper cover 22 is not continuously rotated with respect to the base body 21, and the included angle between the upper cover 22 and the base body 21 is approximately 110 degrees (see FIG. 5). As a consequence, after the tablet personal computer 3 is accommodated within the receptacle 221 of the upper cover 22, the change of the gravity force exerted on the upper cover 22 will no longer cause rotation of the upper cover 22 with respect to the base body 21. Moreover, after the keyboard device 2 is placed on a working surface (e.g. a desk surface), the handle 211 is also contacted with the working surface. As a consequence, the keyboard device 2 is supported on the working surface to prevent from turnover of the keyboard device 2.

After the tablet personal computer 3 is installed in the keyboard device 2, the first wireless transmission module 32 is activated, and then the first wireless transmission module 32 starts to communicate with the second wireless transmission module 214 of the base body 21. After the first wireless transmission module 32 is in communication with the second wireless transmission module 214, the user may depress one or more keys 212 of the base body 21 to generate corresponding characters, symbols or instructions. These characters, symbols or instructions are transmitted to the first wireless transmission module 32 through the second wireless transmission module 214. Consequently, these characters, symbols or instructions are transmitted to the tablet personal computer 3.

Figure 6:
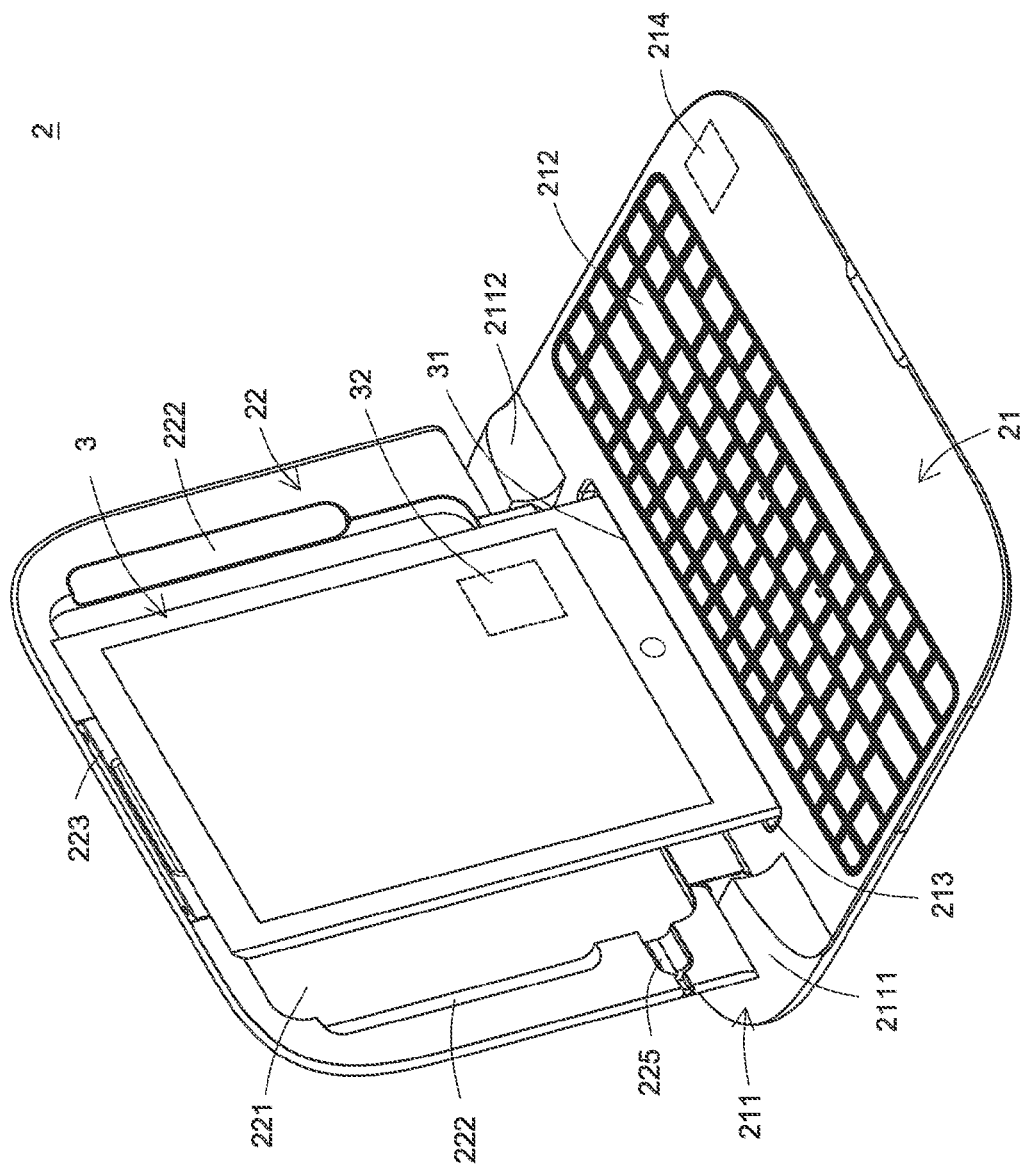
FIG. 6 is a schematic perspective view illustrating the operations of the tablet personal computer with the keyboard device according to another embodiment of the present invention, in which the tablet personal computer is supported by the keyboard device.

In the above embodiment, the tablet personal computer 3 is installed in the receptacle 221 of the keyboard device 2. Hereinafter, another embodiment of operating the tablet personal computer 3 with the keyboard device 2 will be illustrated with reference to FIG. 6. FIG. 6 is a schematic perspective view illustrating the operations of the tablet personal computer with the keyboard device according to another embodiment of the present invention, in which the tablet personal computer is supported by the keyboard device. As shown in FIG. 6, the fixing recess 213 of the base body 21 is slightly longer than the short side 31 of the tablet personal computer 3. As a consequently, when the short side 31 of the tablet personal computer 3 is accommodated within the fixing recess 213 and the tablet personal computer 3 is also supported by the upper cover 22, the tablet personal computer 3 may be uprightly fixed in the fixing recess 213 of the base body 21 without falling down. Similarly, by depressing one or more keys 212, corresponding characters, symbols or instructions are inputted into the tablet personal computer 3.

When the user wants to simultaneously carry the tablet personal computer 3 and the keyboard device 2 in the travelling route, the tablet personal computer 3 may be placed within the receptacle 221, and then the upper cover 22 is rotated with respect to the base body 21. As the upper cover 22 approaches the base body 21, the first magnetic elements 215 of the base body 21 and the second magnetic elements 224 of the upper cover 22 are magnetically attracted by each other. Consequently, the upper cover 22 is closed to cover the base body 21. In this situation, the keyboard device 2 is shaped as a travelling case (see FIG. 7). Once the handle 211 is grasped by the user's hand 4, the keyboard device 21 may be handheld. In addition, through the circular hole 226, the mark 35 of the tablet personal computer 3 is exposed outside to be visible (see FIG. 7). Since the first magnetic elements 215 of the base body 21 and the second magnetic elements 224 of the upper cover 22 are magnetically attracted by each other when the base body 21 is covered by the upper cover 22, the possibility of causing detachment of the upper cover 22 from the base body 21 during the keyboard device 2 is carried will be minimized. In some embodiments, the second magnetic elements 224 of the upper cover 22 may be replaced by metallic elements. When the base body 21 is covered by the upper cover 22, the metallic elements of the upper cover 22 will be magnetically attracted by first magnetic element 215 of the base body 21 in order to prevent detachment of the upper cover 22 from the base body 21. Similarly, in some embodiments, the first magnetic elements 215 of the base body 21 may be replaced by metallic elements. When the base body 21 is covered by the upper cover 22, the metallic elements of base body 21 will be magnetically attracted by the second magnetic elements 224 of the upper cover 22.

From the above description, the keyboard device 2 of the present invention can be operated with the tablet personal computer 3. According to the practical requirements of the user, the shape of the keyboard device 2 may be changed. When the user wants to operate the tablet personal computer 3, the upper cover 22 of the keyboard device 2 may be firstly opened and then the tablet personal computer 3 is installed in the keyboard device 2. In this situation, the user may operate the tablet personal computer 3 through the keyboard device 2 in the usual practice. Whereas, when the user wants to simultaneously carry the tablet personal computer 3 and the keyboard device 2, the upper cover 22 may be closed to change the shape of the keyboard device 2 as a travelling case, which is carried more easily. Moreover, since the handle 211 and the base body 21 of the keyboard device 2 may be integrally formed, the structure of the keyboard device 2 is reinforced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A keyboard device for use with a tablet personal computer, said keyboard device being in communication with said tablet personal computer and permitted to store said tablet personal computer therein, said keyboard device comprising:
   a base body comprising a handle and plural keys, wherein said handle is disposed at a first edge of said base body and integrally formed with said base body, and said keys are disposed on said base body for inputting at least one character or at least one instruction into said tablet personal computer; and
   an upper cover connected with said base body, and rotatable with respect to said base body to shelter said base body or define an included angle between said upper cover and said base body, wherein said upper cover has a receptacle for accommodating said tablet personal computer, wherein when said upper cover is rotated with respect to said base body to define said included angle between said upper cover and said base body, said handle is contacted with said upper cover, so that said upper cover is stopped from being continuously rotated with respect to said base body.

2. The keyboard device according to claim 1 wherein said base body further comprises a receiving part, which is arranged between said plural keys and said first edge of said base body for accommodating a short side of said tablet personal computer, thereby preventing detachment of said tablet personal computer from said receiving part.

3. The keyboard device according to claim 1 wherein said tablet personal computer further comprises a first wireless transmission module, and said base body further comprises a second wireless transmission module in communication with said plural keys, wherein when said second wireless transmission module is in communication with said first wireless transmission module, said at least one character or said at least one instruction inputted by depressing said plural keys is transmitted from said second wireless transmission module to said first wireless transmission module.

4. The keyboard device according to claim 3 wherein said first wireless transmission module and said second wireless transmission module are Bluetooth transmission modules.

5. The keyboard device according to claim 1 wherein said upper cover further comprises:
- an auxiliary recess disposed beside said receptacle, wherein when said tablet personal computer is accommodated within said receptacle, a short side of said tablet personal computer is exposed outside through said auxiliary recess; and
- a locking element disposed on an upper rim of said upper cover, and movable with respect to said upper rim of said upper cover, wherein when said locking element is moved with said upper rim of said upper cover to a fixed position, said tablet personal computer is stopped by said locking element and fixed within said receptacle, wherein when said locking element is moved with said upper rim of said upper cover to a releasing position, said tablet personal computer is not stopped by said locking element.

6. The keyboard device according to claim 1 wherein said handle further comprises a battery room for accommodating a battery, so that electricity generated by said battery is outputted through said battery room.

7. The keyboard device according to claim 1 wherein said base body further comprises a first magnetic element arranged at a second edge of said base body, and said upper cover further comprises a second magnetic element arranged at an upper rim of said upper cover, wherein when said upper cover is rotated with respect to said base body, said first magnetic element and said second magnetic element are magnetically attracted by each other, so that said base body is covered by said upper cover.

8. The keyboard device according to claim 1 wherein said base body further comprises a magnetic element arranged at a second edge of said base body, and said upper cover further comprises a metallic element arranged at an upper rim of said upper cover, wherein when said upper cover is rotated with respect to said base body, said metallic element is magnetically attracted by said magnetic element, so that said base body is covered by said upper cover.

9. The keyboard device according to claim 1 wherein said base body further comprises a metallic element arranged at a second edge of said base body, and said upper cover further comprises a magnetic element arranged at an upper rim of said upper cover, wherein when said upper cover is rotated with respect to said base body, said metallic element is magnetically attracted by said magnetic element, so that said base body is covered by said upper cover.

10. The keyboard device according to claim 1 wherein said handle comprises:
- a first stopping part arranged at a first side of said first edge of said base body;
- a second stopping part arranged at a second side of said first edge of said base body;
- a first rotating shaft extended from said first stopping part and inserted into a first side of said upper cover; and
- a second rotating shaft extended from said second stopping part and inserted into a second side of said upper cover, so that said upper cover is rotatable with respect to said base body, wherein when said upper cover is rotated with respect to said base body to define said included angle, said first stopping part is contacted with a first end of said upper cover and said second stopping part is contacted with a second end of said upper cover, so that said upper cover is stopped from being continuously rotated with respect to said base body.

* * * * *